United States Patent
Vincent et al.

(10) Patent No.: US 7,134,405 B2
(45) Date of Patent: Nov. 14, 2006

(54) PROCESS

(75) Inventors: Matthew William Vincent, Milton Keynes (GB); Paul Joseph Richards, Milton Keynes (GB); Timothy John Donovan, Northants (GB); Damian Joseph Catterson, Milton Keynes (GB)

(73) Assignee: The Associated Octel Company Limited (GB)

( * ) Notice: Subject to any disclaimer, the term of this patent is extended or adjusted under 35 U.S.C. 154(b) by 91 days.

(21) Appl. No.: 10/479,313

(22) PCT Filed: Apr. 18, 2002

(86) PCT No.: PCT/GB02/01802

§ 371 (c)(1),
(2), (4) Date: Jun. 7, 2004

(87) PCT Pub. No.: WO02/097256

PCT Pub. Date: Dec. 5, 2002

(65) Prior Publication Data
US 2004/0231615 A1 Nov. 25, 2004

(30) Foreign Application Priority Data

May 31, 2001 (GB) .................................. 0113195.2
Feb. 26, 2002 (GB) .................................. 0204506.0

(51) Int. Cl.
*F02B 25/00* (2006.01)
(52) U.S. Cl. ............... 123/1 A; 44/629; 137/101.11
(58) Field of Classification Search ............... 123/1 A; 44/629, 639; 137/101.11
See application file for complete search history.

(56) References Cited

U.S. PATENT DOCUMENTS

| 4,161,160 | A | | 7/1979 | Hicks et al. |
| 4,557,221 | A | * | 12/1985 | Kamel et al. ............... 123/1 A |
| 4,568,248 | A | | 2/1986 | Harders |
| 4,621,593 | A | | 11/1986 | Rao et al. |
| 4,715,325 | A | * | 12/1987 | Walker ....................... 123/1 A |
| 4,727,827 | A | | 3/1988 | Hoffman et al. |
| 5,195,466 | A | | 3/1993 | Schulte et al. |
| 5,573,557 | A | * | 11/1996 | Thunker et al. .............. 44/639 |
| 6,068,672 | A | * | 5/2000 | Watson et al. ............... 44/629 |

FOREIGN PATENT DOCUMENTS

| DE | 36 26 419 A1 | 2/1988 |
| DE | 41 06 697 C1 | 4/1992 |
| DE | 43 32 933 A1 | 3/1995 |
| EP | 0 488 831 A1 | 6/1992 |
| EP | 0 661 429 A1 | 7/1995 |
| EP | 1 114 923 A2 | 7/2001 |

(Continued)

OTHER PUBLICATIONS

Bay & Riisager ApS invoice Mar. 10, 2001 (with translation).

(Continued)

*Primary Examiner*—Stephen K. Cronin
*Assistant Examiner*—Arnold Castro
(74) *Attorney, Agent, or Firm*—Fay, Sharpe, Fagan, Minnich & McKee, LLP

(57) ABSTRACT

The present invention provides a process for dosing a fuel with a fuel additive comprising (i) passing the fuel from a fuel container through a dosing apparatus (ii) dosing the fuel with additive in an amount based on the fuel passing through the dosing apparatus and independently of the concentration of the additive in the fuel (iii) returning a portion of the fuel to the container.

26 Claims, 11 Drawing Sheets

Additive concentration change with simple dosing system

FOREIGN PATENT DOCUMENTS

| | | |
|---|---|---|
| EP | 1 158 148 A2 | 11/2001 |
| JP | 60-108710 | 7/1985 |
| JP | S60-82517 | 7/1985 |
| JP | S60-108710 | 7/1985 |
| JP | S61-74615 | 5/1986 |
| WO | WO 95/03482 | 2/1995 |
| WO | WO 99/36488 | 7/1999 |

OTHER PUBLICATIONS

SAE Technical Paper Series 840078; International Congress & Exposition, Detroit, Michigan, Feb. 27-Mar. 2, 1984.

* cited by examiner

Figure 1:
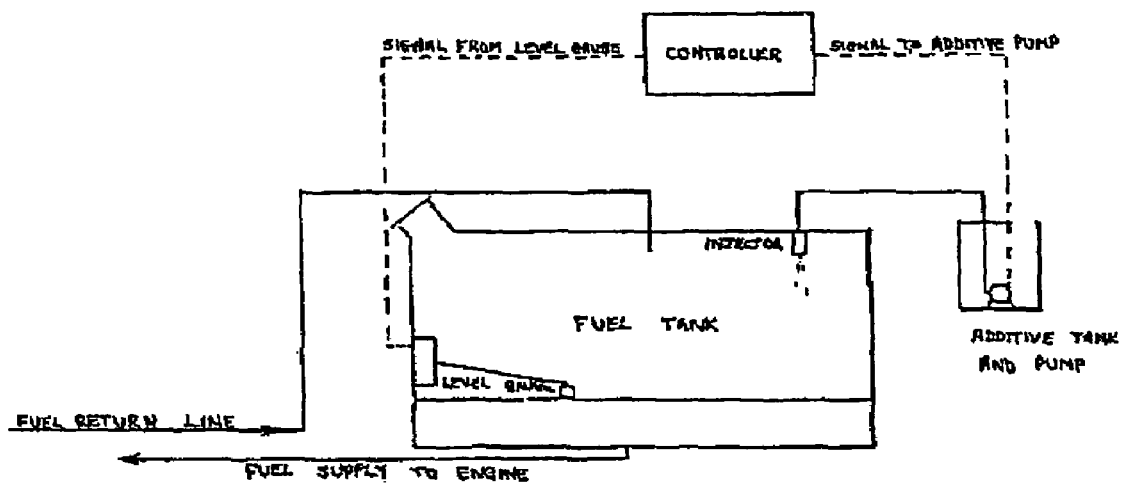

Figure 1: Diagram of electronically controlled dosing system

Prior Art

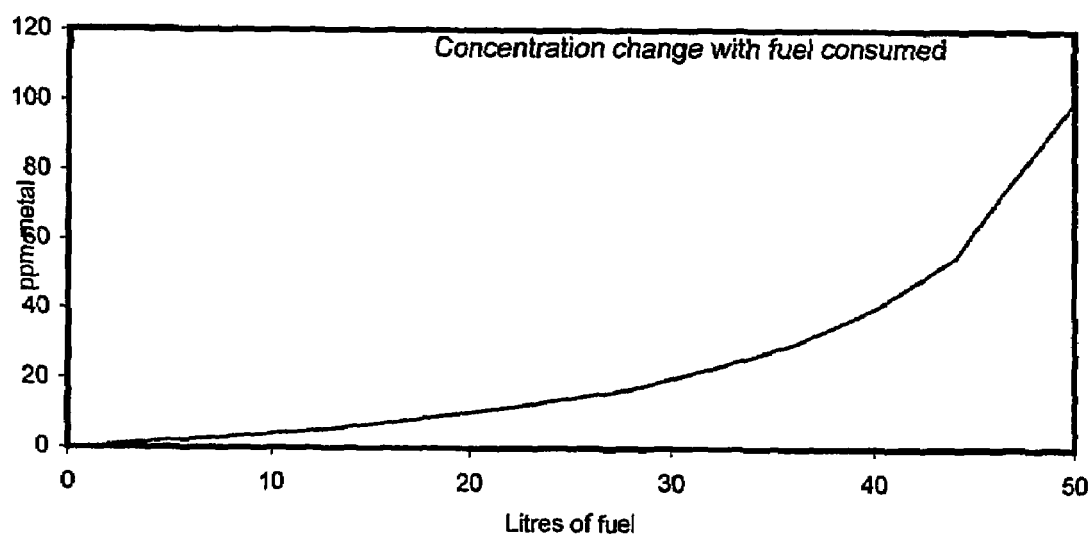
Figure 3: Additive concentration change with simple dosing system

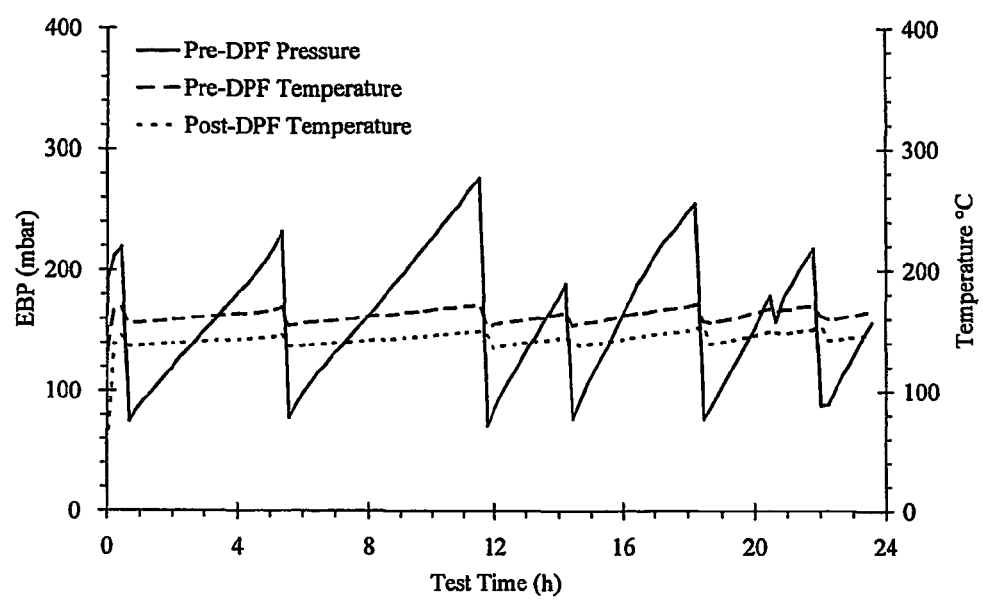
Figure 4: Accumulation of soot and regeneration events in a bed engine DPF using fuel pre-treated with additive

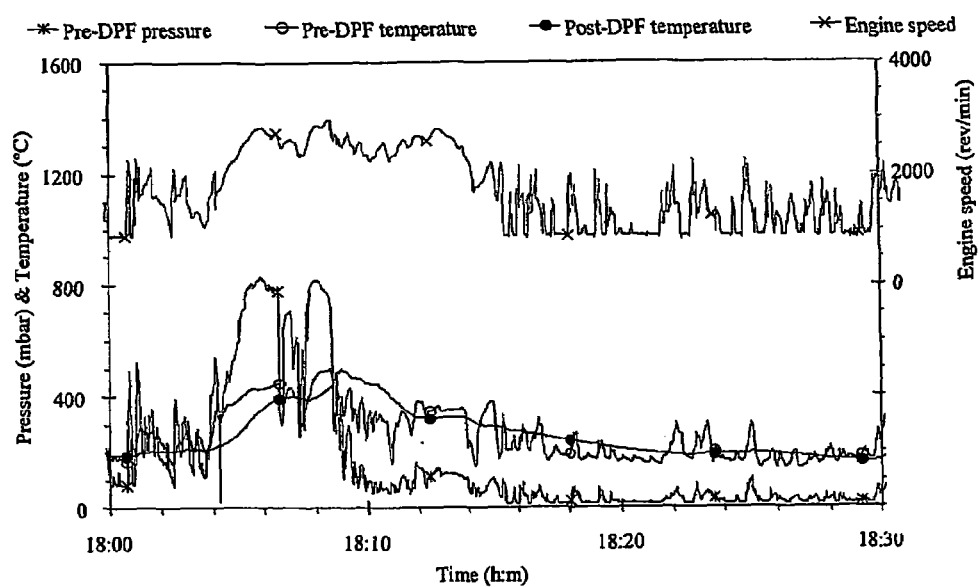
Figure 5: Regeneration (burn-out) of accumulated soot in a road vehicle DPF using fuel pre-treated with additive

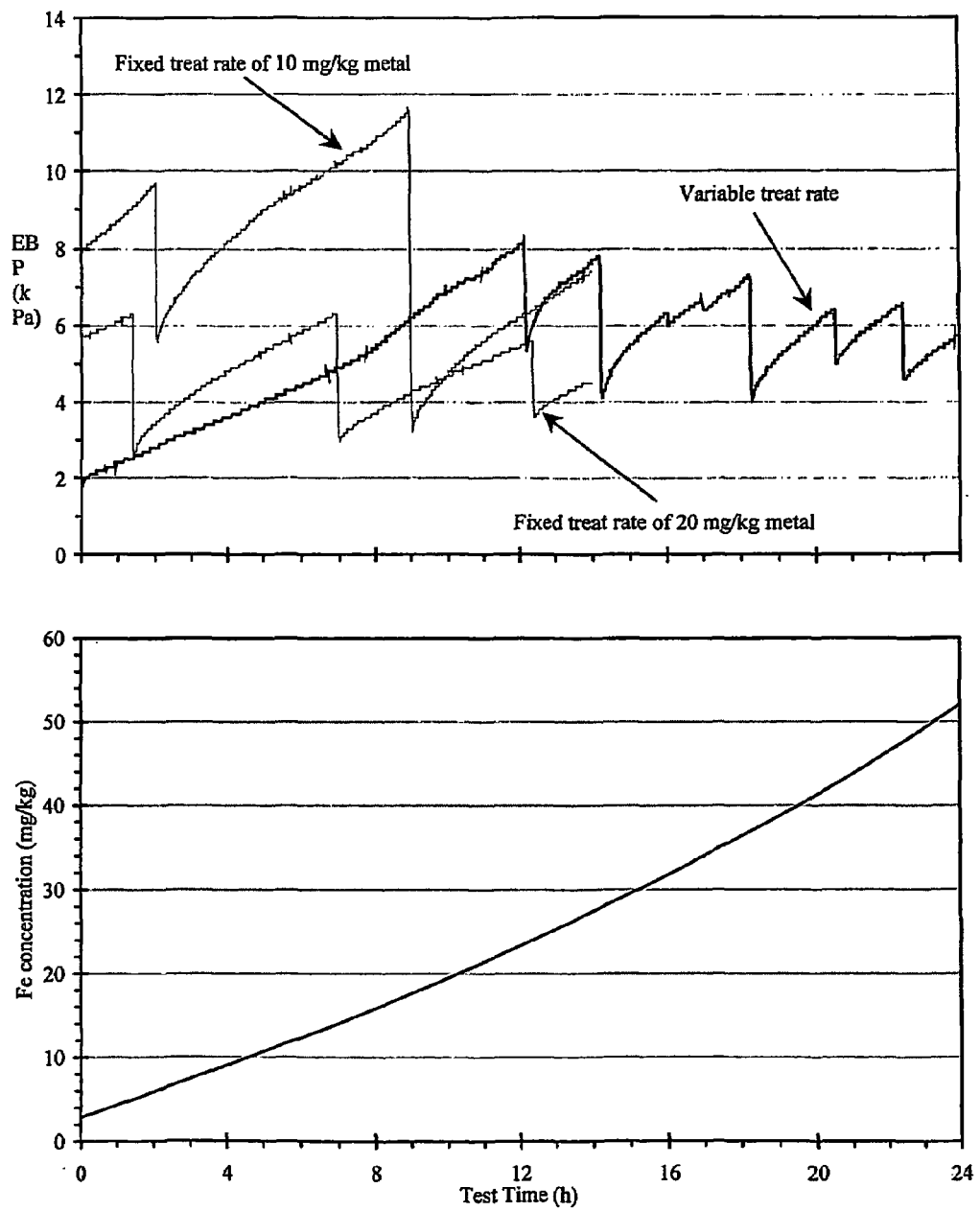
Figure 6 : Traces comparing DPF regneration with pre-treated fuel and operation with the simple dosing device giving variable fuel additive concentration with time. Engine operating condition is 1260 rev/min and 5 Nm torque.

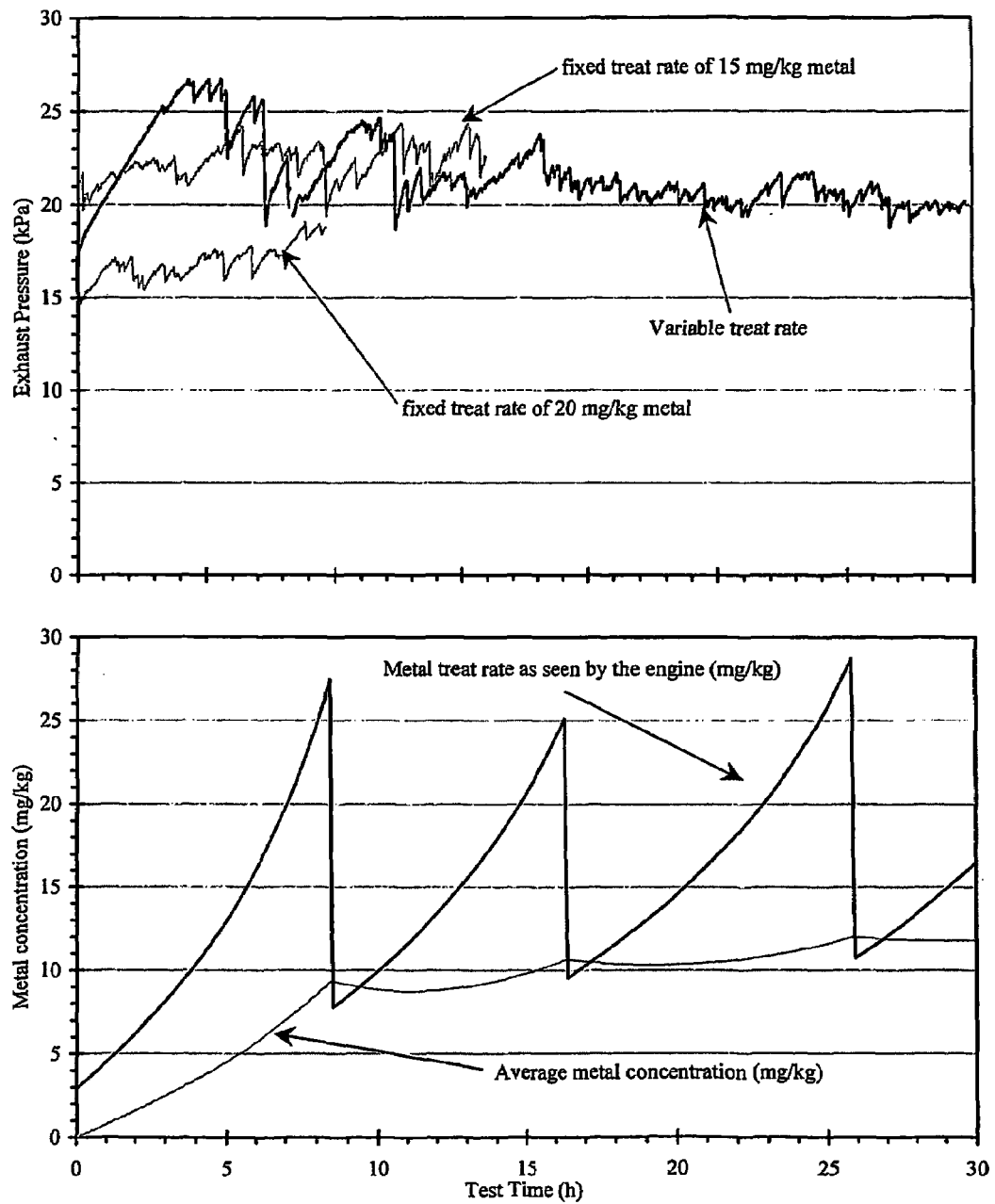
Figure 7 : Traces comparing DPF regneration with pre-treated fuel and operation with the simple dosing device giving variable fuel additive concentration with time. Engine opera ting condition is 2710 rev/min and 30 Nm torque.

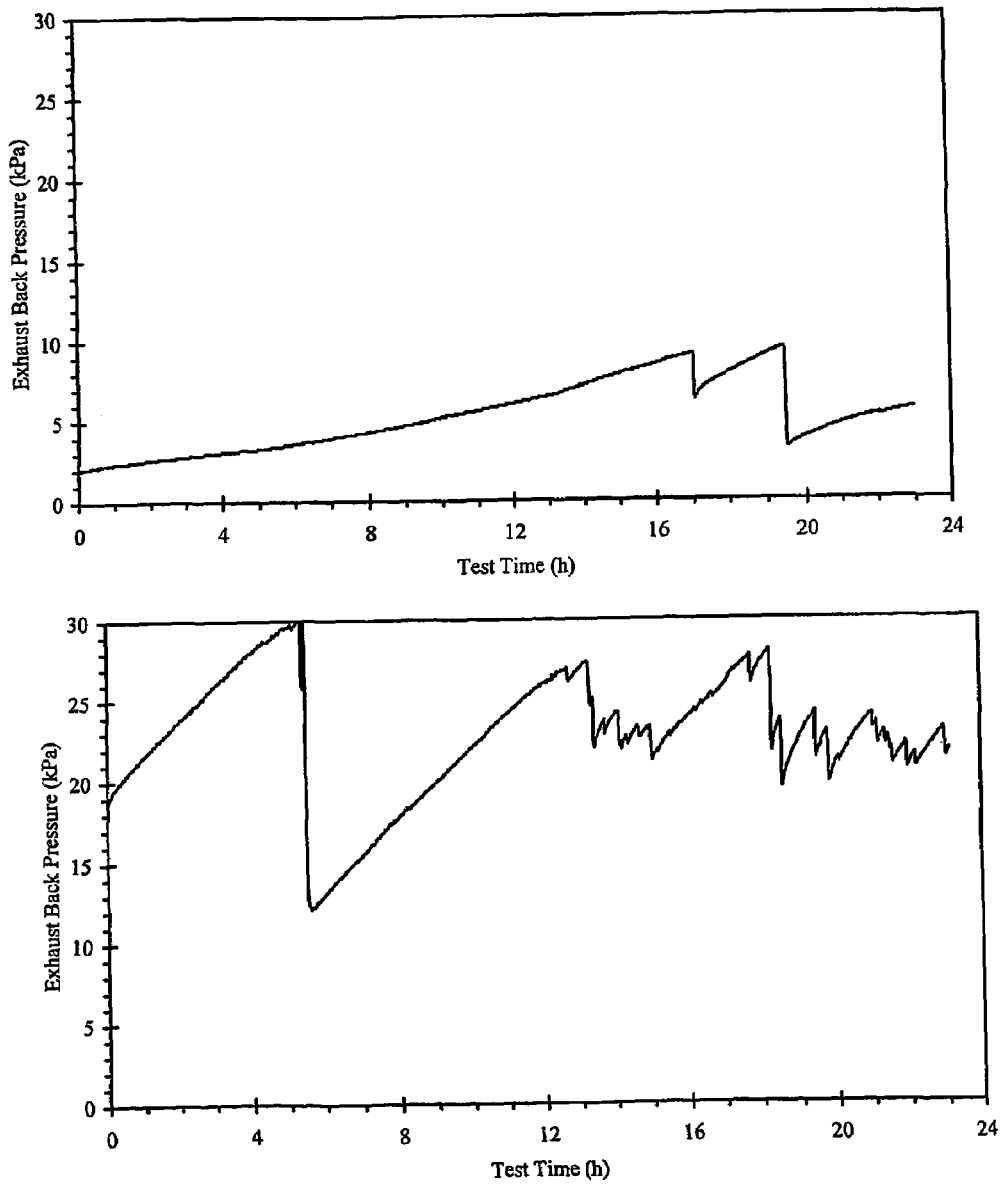
Figure 8. Traces showing exhaust back pressures for 1260 rev/min 5Nm (upper) and 2710 rev/min 30Nm engine operation (lower). Same fixed dose rate of 34mg/hr of additive added to fuel for both operating conditions using simple dosing system, giving increasing fuel additive concentration over time.

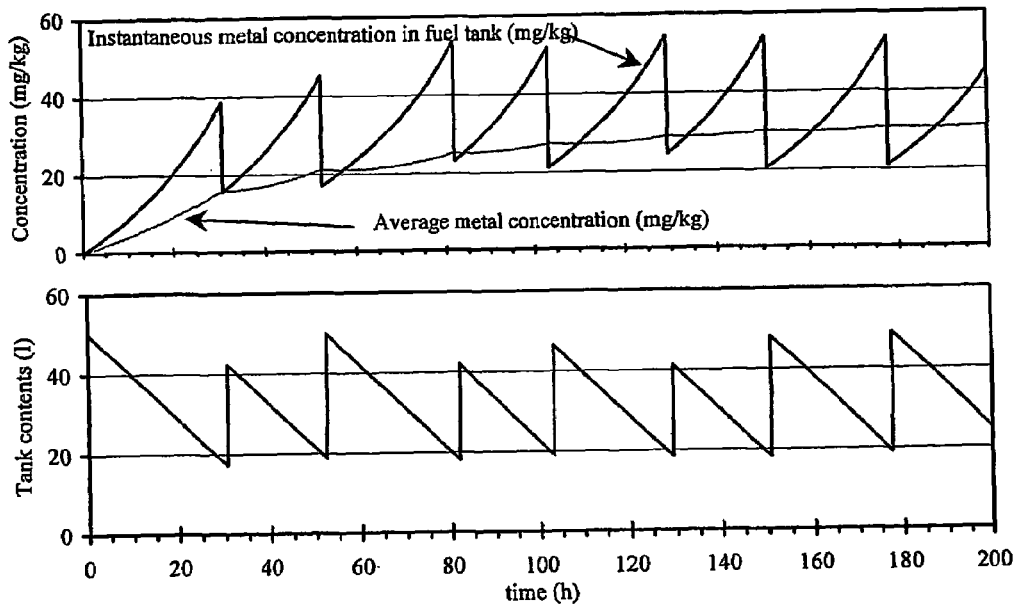
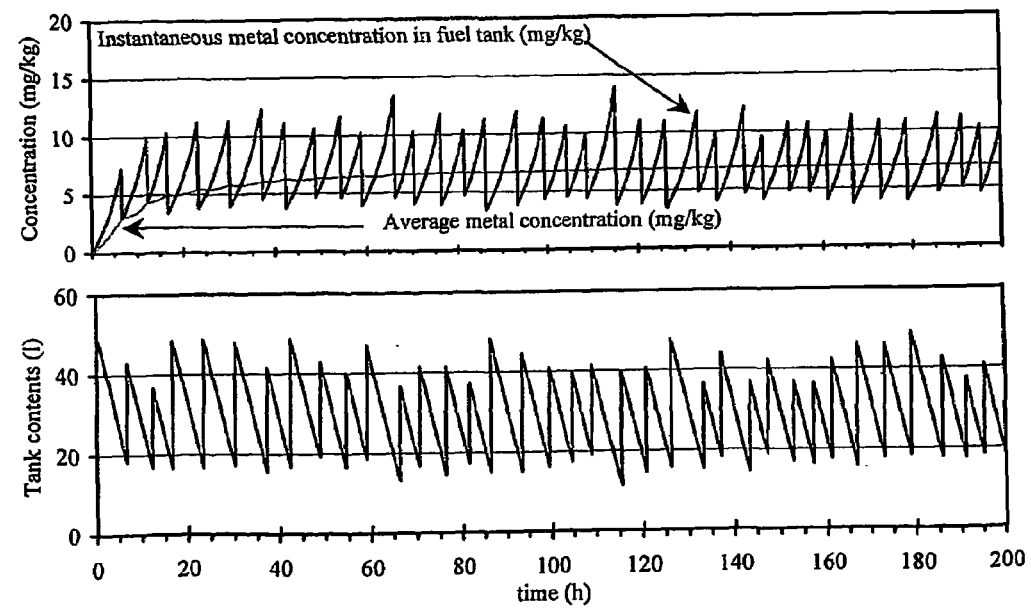
Figure 9. Changes in average metal concentration in fuel with time resulting from fixed additive dose rate of 34mg/hr into fuel using simple dosing device. Upper panels show results for 1260rev/min 5Nm engine operation. Lower panels show results for 2710 rev/min 30Nm engine operation.

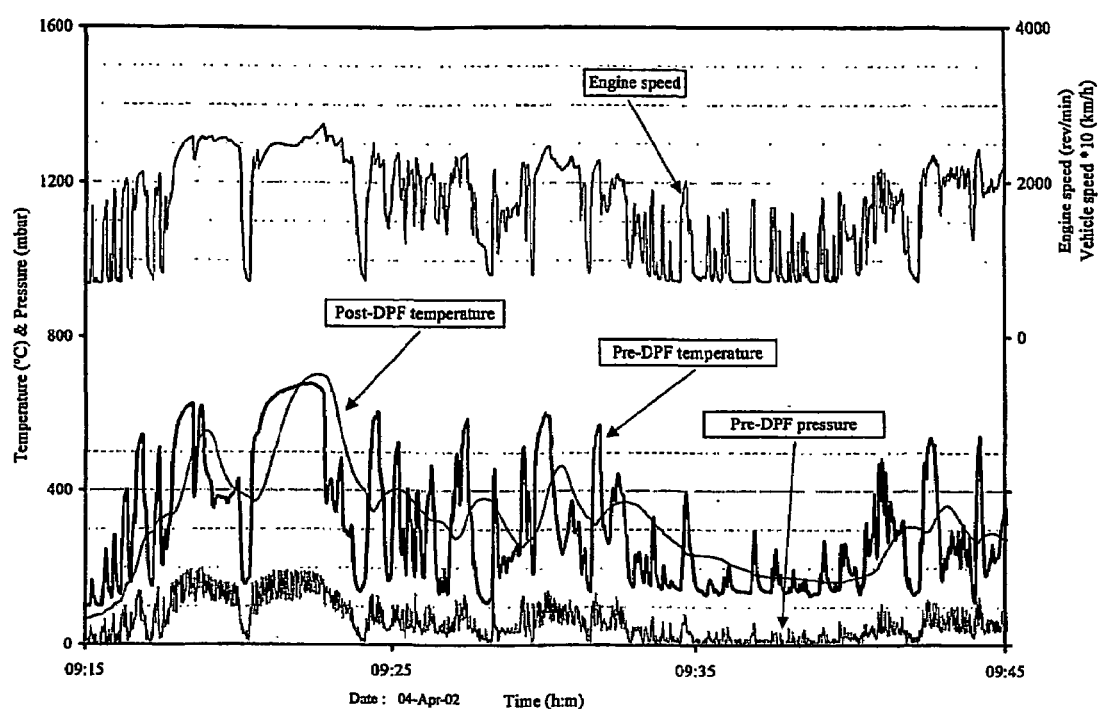
Figure 10  Data logger trace from vehicle equipped with DPF and dosing apparatus

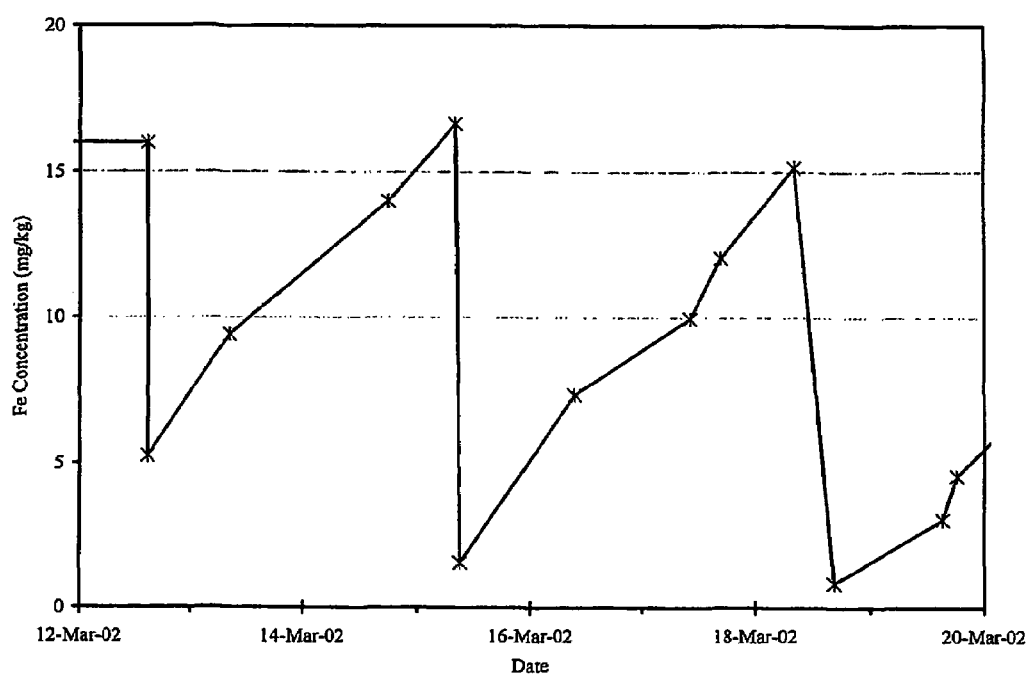
Figure 11  Change of additive concentration in fuel tank over time, including refuelling

PROCESS

The present invention relates to a process for dosing an additive in to a fuel.

BACKGROUND ART

DPF Regeneration

It is well known to those skilled in the art that fuel additives containing metals ("fuel borne catalysts" or FBC) are effective in reducing the combustion temperature of soot accumulated in a trap or DPF. Prior art in this respect is well established. A paper by Salvat et al presented at the SAE World Congress in Detroit in March 2000 (Ref: SAE 2000-01-0473) indicates the 20 year interest in DPFs, and lists many papers by those working in this area.

Iron based fuel soluble additives are known to be effective in this way. In his paper SAE 980539, presented at the SAE International Congress and Exposition in Detroit in Feb. 1998, Mayer describes iron based fuel soluble additives as having a catalytic effect on the burn out of soot trapped in a DPF. Mayer also mentions additives based on cerium and copper for catalytic effect, and indicates that these additives were commercially available for use with DPFs in 1998.

In addition, our earlier publication WO 99/36488 describes fully how preparations of iron in combination with either calcium or strontium can be used to catalyse soot combustion in a DPF.

The application of metallic additives to liquid hydrocarbon fuels for internal combustion engines requires that a suitable preparation of the metal-containing additive or additives be formulated to ensure complete dispersion into the body of the fuel. This may be carried out in a variety of ways, one of which is to produce a colloidal suspension of a metal-bearing compound in the fuel. It is well known that cerium oxide can be incorporated in a colloidal suspension for injection into diesel fuel. Salvat et al describe a commercial system for use on production passenger cars in their paper SAE 2000-01-0473.

An alternative and preferred method is to produce an organo-metallic chemical compound soluble in the hydrocarbon fuel. This method is preferred because combining the desired metal ion with a suitable organic molecule, which is soluble in the hydrocarbon diesel fuel, allows the desired metal to be introduced in molecular form into the combustion chamber. However, production cars made by PSA Peugeot Citroen in France rely on the use of cerium oxide in a colloidal suspension, injected into the fuel, to assist the process of combustion of trapped soot in the DPF. This method is clearly satisfactory if not ideal.

Other metal bearing additives, either of a single metal, or using a combination of one or more metals are known to those skilled in the art to be effective in reducing the combustion temperature of trapped soot. These include but are not limited to iron, iron and strontium, iron and calcium, iron and cerium, sodium and strontium, cerium and platinum, copper, manganese.

It is clear that a method of introduction of a selected metallic species into the combustion chamber is required, which will result in the desired metal being combined with the soot formed during the combustion process. A very finely divided and uniform dispersion of the catalytic metal species, which is ideally suited to the task of catalysing the burn-out of soot in the DPF is desirable. Either a fuel soluble or colloidal form of the desired metallic species is of great benefit as a means to introduce the metal species into the fuel.

Factory Fit Dosing Systems

Modern passenger cars, as is known to those skilled in the art, are equipped with electronic control systems, which incorporate a microprocessor. This device monitors and handles inputs from various instrumental transducers, including a control unit generally called an engine management system. Salvat et al in SAE 2000-01-0473 describe how such a device can be used to control or bring about the regeneration event, that is the combustion of trapped soot in a DPF.

Where a DPF is fitted to a vehicle powered by a diesel engine with common rail injection, the opportunity is provided for active control of the DPF. It is therefore not necessary to wait until the required temperature and pressure conditions normally required for passive soot combustion exist. Soot burn out with a controlled system can be produced by means of a technique called post fuel injection, as described in SAE 2000-02-0473.

Excess fuel is injected from the common rail, which is in effect a pressurised hydraulic reservoir containing diesel fuel, very late in the combustion process. The additional fuel raises the temperature of the exhaust gas and hence the DPF, and causes any accumulated soot to burn out, thus regenerating or cleaning the DPF. In the same paper, an additive dosing system is described. The system ensures that fuel additive, needed to assist the regeneration process, is added to the fuel.

The overall control system described in FIG. 9 of Salvat et al's SAE paper number 2000-01-6473 shows a number of elements in the dosing system needed to ensure that additive reaches the fuel in the tank in the required ratio of additive to fuel. These elements include (i) a tank level gauge for sensing the tank contents, and therefore able to detect any addition of fuel to the tank ("refueling event"), (ii) an additive container, (iii) a pump inside the additive container, (iv) an injection device capable of adding the organometallic additive into the fuel in the tank, and (v) an electronic controller operating on the main fuel tank signal, and monitoring the addition of additive into the fuel to ensure the correct dosing rate. These elements are shown in a diagram in FIG. 1 below.

The level of sophistication of the system described is in part due to the characteristics of diesel injector pumps for light duty vehicles. As is well known to those skilled in the art, these devices pump fuel at a much greater rate than is required merely to supply fuel to the engine. Under all operating conditions, a substantial surplus of pumped fuel is provided by the pump. Thus, the engine consumes the proportion needed to provide power demanded by the driver or operator of the vehicle or engine, while the surplus fuel flows back to the fuel tank in a "return line".

The arrangement whereby a significant surplus of fuel is pumped, above the needs of the engine to provide power, derives in part from the need to cool and lubricate the injection pump itself. The consequence of this, is that in the case of the system described in SAE 2000-01-0473, considerable complexity results in order to dose fuel after the refuelling event with the precise amount of additive required for the contents of the tank. Once the fuel is dosed to the required level, the dosing system controller shuts off to prevent any further additive being added to the fuel, until the next refuelling event.

Precise detection of a refuelling event is also not a trivial task, because of the number of different operating conditions and physical situations which a vehicle equipped with a DPF and dosing system may encounter. For example, when such a vehicle is operated other than in a horizontal plane, but is either sloping from front to rear or from side to side or both, fuel inside the fuel storage tank will alter its relative position within the tank. A level indicator device inside the tank may interpret this change as a refuelling event. Similarly the dynamic effects of vehicle movement, either acceleration, braking or cornering may result in the tank level indicator device responding as if the vehicle had been refuelled, leading to erroneous addition of additive to the fuel. Were this to happen, a significant over treatment of DPF regeneration additive in the fuel can result. To prevent this from happening, additional interlocks and safeguards are necessary. This introduces additional complexity and cost.

For new vehicles of novel design, the provision of a dosing system for DPF additive, fully integrated into the vehicle management system, while not a trivial undertaking, is feasible and entirely practicable if undertaken as part of the overall design and manufacturing process. The chief disadvantages of installing such a system, arise mainly from considerations of cost and complexity, which in turn may have implications for long term reliability. EP1158148A2 illustrates the complexity of logic required to ensure that additive is only dosed into fuel after a refuelling event where the dosing unit forms part of an overall electronically controlled system.

RetroFit Dosing Systems

For older vehicles, of which there are many millions world-wide, the use of a DPF is entirely feasible as an effective means to reduce particulate emissions. Publications documenting the success in reducing particulate emissions achieved by fitting a DPF to an older vehicle ("retrofitting"), are very numerous, but as examples, SAE paper numbers 2000-01-0474, and 2000-01-2849 will serve to demonstrate the feasibility of retrofitting DPFs to older vehicles.

SAE 2000-01-0474 describes the operation of a variety of vehicles, both light and heavy duty, with retrofitted DPF systems. SAE 2000-01-2849 describes the operation of a car which had covered 80,000 km without a DPF, for a further 80,000 km fitted with a DPF. Independent confirmation of the feasibility of retrofitting existing vehicles with a DPF is provided by a paper presented at the International Conference on $21^{st}$ Century Emissions Technology. This conference was organised by the Institution of Mechanical Engineers, and held in London in Dec. 2000.

Paper number C588/021/2000 shows emissions reduction benefits from vehicles retrofitted with DPFs. These benefits were comparable with those obtained from a new vehicle fitted with a DPF as original equipment, and having its own dosing system of the type described in the PSA Peugeot Citroen paper SAE 2000-01-0473.

All the vehicles retrofitted with DPFs, described in SAE papers 2000-01-0474 and 2000-01-2849 and I.Mech E paper C588/021/2000, operated using pre-treated fuel. The fuel for the vehicles was dosed with additive in advance of refuelling, in order to eliminate the need to fit a dosing system to the vehicle. Commercially available additive dosing systems are in use on vehicles retrofitted with DPFs, and these generally rely on a level gauge to detect the refuelling event. This involves the generation of an electrical signal, which in turn is used to effect injection of the additive into the fuel, by means of an electrically operated device.

Dosing systems which utilise an electrical signal, and one or more electrical devices to add the required dose of additive into the fuel, also frequently use a micro-processor to calculate the required dose of additive needed after the refuelling event. This approach therefore leads to a similar level of complexity for the overall dosing system, and requires similar electrical interfaces and control units, for retrofit as for original equipment installations. A key requirement for dosing systems which rely on detecting a refuelling event as the basis for additive dosing into the fuel, is the provision of interlocks and safeguards to ensure that refuelling has actually taken place, as previously described in respect of factory fit equipment. Failure to do this carries the risk that erroneous multiple dosing of additive into the fuel will occur when no refuelling event has taken place, which not only would deplete stored fuel additive very quickly, but would also increase ash burden in the DPF through the excessive metal content of the treated fuel.

It is possible to dispense with the complexity described above in respect of additive dosing systems. DE 43 32 933 C 2 describes the use of a device fitted into the fuel line of a vehicle fitted with a diesel engine, which doses a DPF additive in proportion to the flow of fuel. A diagram of the working principle taken from DE 43 32 933 C 2 is shown in FIG. 2.

Figure 2:
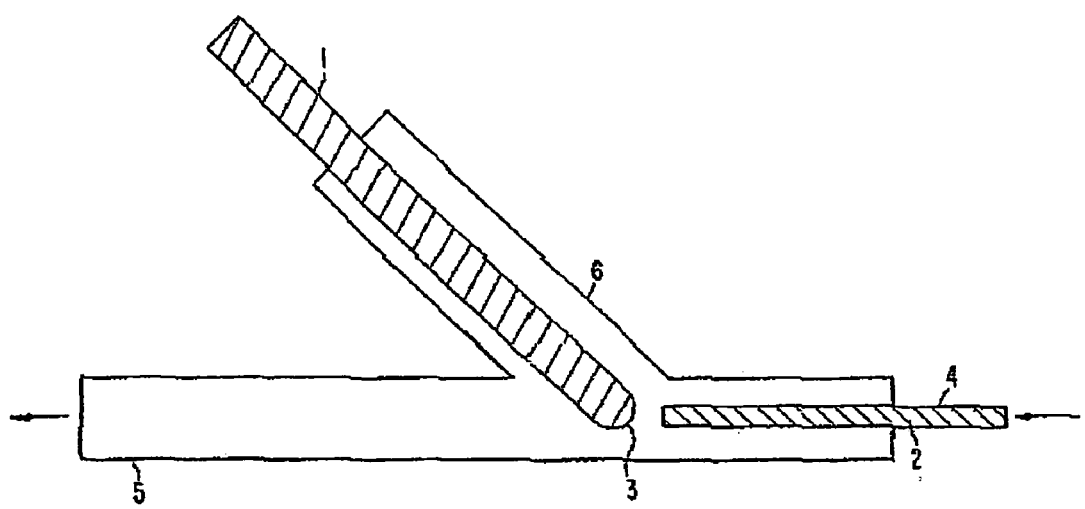

This type of device, as illustrated in FIG. 2, relies on a particular property of the additive, whose registered name is "SATAcen®", namely the ability to be pressed and sintered into fuel-soluble pellets. The pellets are contained in the vessel marked 1 in the diagram, with an orifice for fuel contact at the point marked 3 in the diagram. The pellets dissolve in proportion to the area of contact with the fuel, directed by item 4 in the diagram, to contact the container in which the additive pellets are stored. Thus all the fuel in contact with the additive container, will become dosed with additive, as the pellets slowly dissolve. Not all additives to be dosed into fuel are available in solid form, so this type of device is limited in its application.

For a soluble additive in liquid form, devices which dose additive into the fuel in proportion to the flow of fuel in a pipe line, or through a chamber, also exist. The general principle of these devices is well known in the industry. A carburettor for an engine powered by petrol or gasoline relies on the principle of flow through a venturi or orifice entraining flow of another fluid in order to mix the two fluids. In the case of the carburettor, the main fluid flowing through the venturi or orifice is air, and the second fluid, to be mixed with the air, is the fuel, frequently termed petrol or gasoline.

Flow entrainment can be applied to other fluids as a method of mixing, and this principle is well known to those skilled in the art. A flow eductor is an example of a device used to mix a major and a minor component where both fluids are in the liquid phase. With care in design, the first fluid flowing past the end of the open eductor pipe creates a slight pressure reduction which induces the flow of a second liquid in proportion to the velocity of flow in the first. In this way, proportionate flow and mixing can be achieved with a simple mechanical device.

An electro-mechanical device can also be simply arranged, as is well known to those skilled in the art, whereby an electrical solenoid is caused to move by an electric current, and in so doing causes one fluid stream to mix with another. Preferably, a solenoid moves under the influence of an electrical current to inject a precise quantity of one fluid in a pulse or jet into the other. For this application the additive to be added into the fuel is acted upon by the solenoid device and the pulse or jet of additive leaving the solenoid device is conveyed to the second fluid, in this case diesel fuel, by means of an appropriate connecting arrangement. The solenoid device can be arranged to operate in a series of pulses at a frequency controlled by an electrical circuit producing a wave form or signal. In this way the flow of the additive into the fuel can be controlled based on the fuel flowing through the dosing apparatus.

The methods described demonstrate the principle of mechanical or electro-mechanical mixing of one major and one minor component, where one or preferably both are in the liquid phase.

Older gasoline powered vehicles almost universally consume all the fuel passing though the fuel metering device, ("once through"), commonly a carburettor. There is therefore no return flow of unburnt fuel to the fuel tank, unlike the case with many modern gasoline engine, and all diesel engine installations.

The present invention alleviates the problems of the prior art.

In one aspect the present invention provides a process for dosing a fuel with a fuel additive comprising (i) passing the fuel from a fuel container through a dosing apparatus (ii) dosing the fuel with additive in an amount based on the fuel passing through the dosing apparatus and independently of the concentration of the additive in the fuel (iii) returning a portion ("the returned portion") of the fuel to the container.

The amount of additive dosed to the fuel is determined based on the fuel passing through the dosing apparatus and independently of the concentration of the additive in the fuel. It will be appreciated that the amount of additive to be dosed is not controlled based on the concentration of the additive in the fuel. However, if dosing is reduced or prevented as a result of high concentration of additive in the fuel, in other words further dosing is inhibited due to the "saturation" of the fuel with the additive, this is not excluded from the scope of the present invention.

In one aspect the present invention provides a combustion engine and exhaust system comprising a fuel storage container configured to pass fuel in operation from the container to a combustion chamber via an additive dosing apparatus, and wherein combustion gases produced in operation pass through an exhaust system comprising a filter, wherein the dosing apparatus is configured to dose the fuel with additive in an amount based on the fuel passing through the dosing apparatus and independently of the concentration of the additive in the fuel and to return a portion ("the returned portion") of the fuel to the container.

Further aspects of the invention are defined in the appended claims.

Application of the simple dosing system in which additive is dosed in an amount based on the fuel passing through the dosing apparatus (independently of the concentration of the additive in the fuel) has previously not thought to be feasible in diesel engines or advanced gasoline engines in which a portion of the fuel is returned to the fuel tank. The return of fuel introduces some variability into the ratio of additive to fuel, which is not present on "once through" applications. The return also introduces the certainty that fuel will receive multiple doses of additive, since fuel is dosed every time it passes through the dosing apparatus. However, we have surprisingly found there are several key factors which will permit the use of a simple dosing device in such fuel dosing and return systems which are typically used on a vehicle fitted with a DPF.

We have found that the small variation is additive to fuel ratio and in DPF applications variations in catalyst to soot ratio which result from changes in the proportion of return flow are swamped by the changes in additive to fuel ratio which result from the falling level of fuel in the vehicle tank. Immediately after refuelling, the concentration of additive in the fuel will be very low. This results from setting the dosing apparatus to dose at a level of less than the required mean dosage level (typically 10–15% of the required mean dosage level). As the tank level falls, repeated dosing of fuel gradually increases the additive concentration.

When the tank is nearly empty, the additive level in the fuel has reached very high levels (typically 50–100 times the initial dosage levels) relative to the case when the tank is full. FIG. 3 shows the pattern of additive concentration resulting from use of the present dosing apparatus in a high return flow fuel installation. The initial supply of fuel after a refuelling event has low active additive content (ppm metal), but as fuel is consumed, active content increases exponentially until active content is very high just before refuelling.

The practical effects of this dosing pattern have been thought to be a disadvantage, since additive treat rate is not constant as for the type of system described in FIG. 9 of SAE paper 2000-01-0473, and shown in FIG. 1. However, in many systems we have found it to be an advantage. For example in DPF systems although soot from the engine, which accumulates in the DPF, initially contains a low catalyst level, i.e. has a low catalyst to soot ratio, subsequent soot laid down has a progressively higher and higher catalyst to soot ratio. However, over the contents of a complete tank of fuel, the mean catalyst to soot ratio will be the same as would be achieved by a complex dosing system, for example that provided by a mean 20 ppm catalyst fuel treat rate.

During consumption of the relatively small volume of fuel when the tank is nearly empty, immediately before refuelling, very high active dose rates are realised. Far from being a disadvantage, this can have significant advantages in terms of procuring a regeneration event, particularly in the case of city operation. Because the mean additive dose rate over time remains that desired, or approximately so, for example an active treat rate of 20 ppm metal, ash accumulation in the DPF will not differ significantly from that achieved with a complex dosing system.

For relatively short periods, at low tank fuel levels, the simple dosing device will produce soot in the DPF containing several times the mean overall catalyst to soot ratio, and this increases the catalytic activity of the FBC. It is therefore more likely that a regeneration event will result in a difficult scenario, i.e. that of city operation, where it is known that low exhaust temperatures make soot burn out difficult to achieve. Thus the dosing apparatus has a significant operational advantage over the more costly complex batch dosing system of the type employing an electronic management system.

The regeneration performance of a DPF using the system of the present invention is likely to benefit from the characteristics of the dosing apparatus of the invention. The apparent disadvantage of variable additive concentration in the fuel as fuel tank level changes can in fact become an operating advantage, given the characteristics of soot storage in the DPF, followed by periodic combustion or regeneration, which is characteristic of the use of a fuel borne catalyst.

We have also found that contrary to the teaching in the art variations in fuel additive concentration in a fuel dosed using the system of the present invention do not materially affect the mean fuel additive concentration over a relevant period of use. Taking for example the use to dose a DPF regeneration catalyst, the DPF fitted to vehicles using fuel additive to assist regeneration must be seen as a batch process device. The Johnson Matthey continuously regenerating trap (CRT) relies on the gas-phase catalyst nitrogen dioxide to oxidise soot particles in the DPF, and in normal operation there is essentially no accumulation of soot within the DPF. However, fuel borne catalysts (FBC) work by intimate incorporation within the soot of combustion, which accumulates in the DPF until conditions of temperature or pressure encourage the burn-out of soot. This has been demonstrated in both bed engine and vehicle tests. SAE paper 982654 demonstrates the classic rise and fall of exhaust system pressure as soot first accumulates and then burns off, in DPF bed engine tests, while SAE paper 2000-01-2849 shows the same process in a test vehicle fitted with a DPF. These are shown in FIGS. 4 and 5 respectively.

Because soot accumulates over typically 200–500 km of normal vehicle operation, small variations in the ratio of additive to fuel are not important, provided the overall ratio ("metal to soot ratio") of catalyst to soot is maintained. Thus, although at any time during the soot accumulation phase, the metal to soot ratio will vary within a reasonably narrow range because of variation in the proportion of return flow, over the time taken to cover 200–500 km, these variations are not important.

It has also surprisingly been found, that although the addition of additive by the simple dosing device is based on the fuel passing through the dosing apparatus, it is not essential to employ an in-built flow meter to measure the flow of fuel. Although the use of a fuel flow meter provides information which can be used to change the amount of additive to dose into the fuel flowing through the dosing apparatus, it has surprisingly been found that the flow meter can be eliminated while still allowing satisfactory regeneration in the DPF.

In practical diesel engine fuel systems, the fuel pumped by the main injection pump is not a linear function of the speed of the engine, because of volumetric efficiency changes with rotational speed. The volume pumped per stroke at slow rotational speeds is greater than the volume pumped per stroke at high rotational speed. Thus, as a non limiting example, over an engine speed range of 1000 rev/min to 4000 rev/min the flow of fuel at 1000 rev/min will be significantly greater than one quarter of the flow at 4000 rev/min. Given that the DPF acts as an averaging device in terms of metal to soot ratio, through accumulation of pretreated soot, it is possible to fix dosing levels of the additive at a mean value between that ideally required for maximum and for minimum fuel flows to the engine. The non-linearity of fuel flow already described makes this process easier, and enables the elimination of the fuel flow meter in the simple dosing device. The characteristics of the flow return arrangements to the tank also have the effect of encouraging a proportionately higher additive dose rate at low engine speeds than at high engine speeds, since more of the total fuel pumped by the engine injector pump returns to the tank at low engine speeds than at high engine speeds. The practical consequences of this are that for sustained high speed operation, additive concentration in the fuel and hence the metal to soot ratio will tend to decrease to low levels over time, whereas for sustained city operation, additive concentration in the fuel and the metal to soot ratio will tend to increase over time.

Operating the simple dosing device at a fixed treat rate has the effect of compensating for exhaust temperature variation as a result of vehicle use. At low speed city operation low exhaust temperatures generally result, but additive dosing levels increase over time, thus assisting DPF regeneration. At high speed much higher exhaust temperatures result, but additive dosing levels reduce over time. However, it is well known to those skilled in the art that sustained high speed produces conditions much more favourable to DPF regeneration where a lower additive dose rate and hence lower metal to soot ratio is not a disadvantage. Where a very mixed pattern of vehicle operation occurs, use of a fixed additive dose rate will not materially affect the average metal to soot ratio in the DPF.

Preferred Aspects

Fuel

Preferably the fuel is diesel.

Additive

Preferably the fuel additive is capable of catalysing the regeneration of a diesel particulate filter.

Preferably the fuel additive is or comprises a metal. Preferably the metal is selected from iron, strontium, calcium, cerium, sodium, platinum, copper, manganese and mixtures thereof. More preferably the metal is iron.

Preferably the fuel additive is soluble in the fuel. Employing a fuel soluble form of the additive may confer additional benefits compared to a colloidal suspension of the additive such as a metallic compound, by allowing a lower treat rate in the fuel. This is principally because the size of the colloidal particles of active material suspended in the fuel is several orders of magnitude greater than an organo-metallic molecule. Greater catalytic activity results from the more finely divided form of metallic species achieved by the use of a fuel soluble additive.

Process

In one aspect the additive is added to the fuel in direct proportion to the instantaneous fuel flow through the dosing apparatus.

In one aspect the additive is added to the fuel based on the flow of fuel passing through the dosing apparatus averaged over time. In other words the additive is added to the fuel based on the average flow of fuel passing through the dosing apparatus. The time period over which an average may be determined may be determined by one skilled in the art. Typical time periods over which averaging may be performed are 1 minute, 1 hour, 10 hours, 100 hours, 1000 hours, and 10,000 hours.

Preferably the portion of the fuel which is not returned to the container is passed to combustion chamber. More preferably the portion of the fuel returned to the container is at least 80% of the fuel passing through the dosing apparatus.

It will be appreciated that it is necessary to reduce the proportion of the additive dose administered to the fuel passing through the dosing apparatus to account for the multiple dosing which will inevitably occur. This aspect is advantageous because it is possible to dose additive into the fuel, either prior to the feed to a combustion chamber, or on a return path to the fuel container, and still achieve a tolerably accurate ratio of additive to fuel.

Preferably the additive dose rate is from 5 to 25% of the desired mean additive treat rate.

More preferably the additive dose rate is from 10 to 15% of the desired mean additive treat rate.

The dosage apparatus may be situated anywhere along the path of fuel from the fuel container to its return to the container.

Preferably the process further comprises passing at least some of the returned portion of fuel through the dosing apparatus one or more further times and returning a portion thereof to the container.

Dosing Apparatus

In one aspect the dosing apparatus comprises an arrangement of an additive container containing a solid fuel soluble additive, such as pellets of SATAcen® iron organo-metallic additive, with an orifice in the lower end by means of which fuel flowing in a pipeline is brought into contact with the additive. The arrangement is shown in FIG. 2. This means of dissolving additive into the fuel is described in DE 43 32 933 C2.

In another aspect the dosing apparatus comprises an additive container containing a liquid fuel soluble additive connected to an electro-mechanical device which meters additive and effects the addition of additive into fuel on the basis of fuel flowing through the apparatus. Preferably the electro-mechanical device is an electrically driven solenoid which controls the amount of additive to be mixed into the fuel and causes it to mix in the desired proportion with fuel flowing through the apparatus. Preferably the solenoid device is arranged to operate in a series of pulses at a frequency controlled by an electrical circuit producing a wave form or signal. In this way the flow of the additive into the fuel is controlled based on the fuel flowing through the apparatus. The efflux from the solenoid device is arranged to mix with the fuel fed to the engine by means of a suitable fluid communication.

In one aspect the dosing apparatus comprises liquid additive disposed in an additive container which is in fluid communication with fuel passing through the dosing apparatus. The liquid additive may be dosed into the fuel passing through the dosing apparatus by an electromagnetic device. The electromagnetic device may be controlled by an electrical circuit to dose additive at a controlled frequency. The electrical circuit may dose additive at a controlled frequency in proportion to the flow of fuel. The electrical circuit may dose additive at a controlled frequency at a fixed level independent of the flow of fuel. In one aspect the electromagnetic device is a solenoid.

In another aspect the dosing apparatus comprises solid fuel soluble additive disposed in an additive container wherein the additive container is in fluid communication with fuel passing through the dosing apparatus. The fuel passing through the dosing apparatus may be controlled by an electromagnetic device. The electromagnetic device may be controlled by an electrical circuit to control fuel flow through the dosing apparatus. The electrical circuit may control the fuel flow through the dosing apparatus in proportion to the flow of fuel from the container. The electrical circuit may control the fuel flow through the dosing apparatus in proportion to the flow of fuel returning to the container. The electrical circuit may control the fuel flow through the dosing apparatus independently of the flow of fuel to or from the container. In one aspect the electromagnetic device is a solenoid.

The fluid communication may be achieved in a variety of ways. Additive leaving the electro-mechanical device can be conveyed through a rigid or flexible pipe connected between the electro-mechanical device and the fuel pipe into which the additive is to be mixed. If this method is adopted, it may be advantageous to arrange for an injector or similar device to be fitted at the point of connection of the additive feed line to the fuel line. The purpose of this injector or similar device is to control the efflux from the electro-mechanical device and to prevent flow of fuel into the pipe connecting the electro-mechanical device to the fuel line. In a simplification, where a very short connecting pipe is employed, the injector device may be omitted.

The electro-mechanical device alternatively can be attached directly to the fuel pipe such that any efflux from the electro-mechanical device passes directly into the fuel. In yet another adaptation, fuel can be arranged to flow axially past the electro-mechanical device, thereby providing cooling, and simultaneously allowing mixing of efflux from the electro-mechanical device with fuel flowing over it.

Similar arrangements can be made to feed the electro-mechanical device with additive to be mixed into the fuel. The complete dosing system may include an additive reservoir or tank for storage of required amount additive to supply the engine with treated fuel, for example over an operational range of many thousands of kilometers, as is convenient for storage on board the vehicle. A connection from the additive storage vessel to the electro-mechanical device is necessary to permit this device to dispense additive into the fuel. The additive storage container may be arranged remotely from the dosing device using a rigid or flexible pipe connection to allow additive to flow into the dosing device. In another arrangement the additive container may be directly coupled to the dosing device using a rigid connection. In a further arrangement, the dosing device may be installed inside the additive container such that the efflux from the dosing device is connected to the pipe supplying fuel to the engine.

The present invention will now be described in further detail by way of example only with reference to the accompanying figures in which:—

FIG. 1 shows a dosing system;
FIG. 2 shows a dosing system;
FIG. 3 shows a graph;
FIG. 4 shows a graph;
FIG. 5 shows a graph;
FIG. 6 shows a graph;
FIG. 7 shows a graph;
FIG. 8 shows a graph;
FIG. 9 shows a graph;
FIG. 10 shows a graph; and
FIG. 11 shows a graph.

The present invention will now be described in further detail in the following examples.

EXAMPLE

A simple additive dosing device was used with a 1.9 liter Peugeot diesel engine, type XUD 9, mounted on a test bed. The exhaust system of the test engine was equipped with a diesel particulate filter (DPF) which trapped soot particles produced by the bed engine. The exhaust line of the bed engine was equipped with a pressure transducer and with thermocouples upstream and downstream of the DPF, in order to produce data of use in the test. The bed engine was arranged to drive a load absorbing device, or dynamometer, and equipped with a computer control system familiar to those involved in engine testing. As a result of this equipment, the engine could be controlled to operate at desired speed and load conditions for long periods, without the need for manual intervention.

Fuel for the bed engine was passed in a feed line from a supply contained in a tank of 50 liters capacity. The fuel supply from the tank was arranged to pass through the dosing apparatus before entering the injection pump of the diesel engine. The dosing apparatus comprised an additive storage tank, electro-mechanical injector unit, an electrical pulse generator and necessary piping to connect the devices. The dosing apparatus treated the fuel with a fixed proportion of additive at a treat rate in the range of approximately 10%–15% of the desired mean treat rate needed for regeneration of the DPF.

Typically the treat rate needed for DPF regeneration lies in the range 5–30 mg iron/kg of fuel, with a preferred typical treat rate of 20 mg iron/kg of fuel. The dosing device achieved a treat rate of 1.5 mg iron/kg, on the basis that typically 80%–95% of the fuel pumped by the engine injector pump returned to the tank. Most of the bed engine fuel would thus pass through the dosing device many times before finally being consumed by the bed engine. Each pass through the dosing device would increase the effective additive treat rate, thus increasing the iron content in the fuel.

Combustion of fuel containing metal additive results in metal compounds, typically metal oxides, trapped in soot formed during the combustion process, as is well known to those skilled in the art. Consequently, where the preferred iron based organo-metallic additive was used to dose the fuel, the iron content of the soot retained in the DPF rose with multiple dosing of the additive into the fuel. As the level of fuel in the tank used to supply the engine fell, metal concentration in the fuel rose in a manner similar to that shown in FIG. 3. Thus, as the fuel level fell in the fuel supply tank, the metal content of trapped soot in the DPF increased.

The test with the XUD 9 bed engine was continued for many hours, operating at fixed speed and load conditions, in order to accumulate sufficient soot in the DPF to trigger regeneration, or burn-out, of the accumulated soot. As is known to those skilled in the art, soot accumulation in a DPF results in an increase in exhaust line pressure after some hours of engine operation. This is caused by the increasing resistance to flow of exhaust gas resulting from soot accumulation in the blind channels of the DPF.

Under fixed speed and load operation, typically at moderate load conditions, examples of which could be 1550 rev/min speed and 20 Nm load, or 2710 rev/min and 30 Nm load, DPF pressure builds up as indicated in FIG. 4. Burn-out of the soot may occur spontaneously, following which exhaust line pressure will fall rapidly, accompanied by an exothermic reaction. This produces differences in exhaust gas temperatures, as measured by the thermocouples upstream and downstream of the DPF. Repeated soot accumulation and burn-out events produce the characteristic "saw-tooth" pattern of exhaust pressure indicated in FIG. 4, which also shows the effect on exhaust gas temperatures of exothermic soot burn-out within the DPF.

Operation of the test bed engine, with exhaust line fitted with a DPF, on fuel treated with iron based organo-metallic additive, produced pressure and temperature patterns similar to those shown in FIG. 4. The preferred iron-based organo-metallic additive was added into the fuel in the manner described using an electro-mechanical solenoid operated dosing system operating at fixed dosing rate irrespective of fuel flow to the engine. Unburnt fuel was returned from the engine injection pump to the fuel storage tank, which resulted in multiple dosing of fuel with the additive as described, and also caused increase in iron concentration in the residual fuel in the storage tank feeding the engine, as fuel level fell in the tank.

The classical pattern of soot accumulation and burn-out resulted in the test, despite the use of an additive dosing arrangement which resulted in a non linear fuel additive concentration with time. The use of a simple dosing system clearly produced a situation very far from the accepted requirement of a uniformly dosed fuel, containing a fixed and predetermined amount of metal in the fuel, yet effective burn-out of soot, or regeneration of the DPF, resulted in the tests. The engine was operated at very low speed low load conditions producing low exhaust temperatures and also at much higher speed higher load conditions resulting in higher temperatures. At both these engine operating conditions, despite different fuel demand from the engine, the dosing system operated at the same fixed set-point condition as determined by the frequency of operation of the solenoid.

Traces from the engine operation are shown in figures to illustrate the regeneration process. Calculations of actual instantaneous additive content in the fuel supplied to the engine and the mean level of additive in the fuel over multiple refuelling events are also included in the figures for illustration.

Traces of engine operation on pre-treated fuel where an exact and constant ratio of metal in the fuel over time was maintained, and regenerations resulted in the DPF, are also shown for comparison. Where additive treat level is reduced in pre-treated fuel, it is observed that exhaust back pressure rises in the DPF. Conversely where higher levels of additive are pre-treated in fuel exhaust back pressures are lower. The upper trace of FIG. 6 shows exhaust back pressure traces for pre-treated fuel containing 10 mg/kg and 20 mg/kg of metal in the fuel. When the simple dosing valve is used and fuel additive levels rise as fuel level in the tank falls, the exhaust back pressure in the DPF can be seen to fall over time until it approaches the level obtained with 20 mg/kg of pre-treated metal in the fuel. The lower trace shows calculated variation of metal concentration in the fuel over time resulting from the use of the dosing device.

Similar traces are shown for engine operation at 2710 rev/min and torque of 30 Nm in FIG. 7. In the upper panel traces are shown for pre-treated fuel containing 15 mg/kg and 20 mg/kg. The lower panel shows the calculated variation of metal treat rate in the fuel with the simple dosing device and also the corresponding average metal concentration in the fuel after several refuelling events. When a refuelling event occurs, there is a sudden drop in fuel metal content caused by the introduction of fresh untreated fuel into the tank. Repeated refuelling events produces the characteristic pattern of additive concentration evident in the lower panel of FIG. 7.

FIG. 8 shows exhaust back pressure traces for two different engine operating conditions, 1260 rev/min 5 Nm torque (upper panel) and 2710 rev/min 30 Nm torque (lower panel). In both cases the simple dosing device was set to provide identical fixed 34 mg/h additive treat rate to the fuel by means of the frequency of operation of the solenoid operated dosing device. The steady increase in additive content in fuel over time resulting from recirculation to the tank of unburnt fuel and consequent multiple treatment is reflected in the more frequent regeneration of the DPF after typically 15–20 h operation. The use of fixed additive treat rate for widely differing engine operation conditions and fuel consumption levels surprisingly results in satisfactory regeneration in the DPF at both conditions.

FIG. 9 shows calculated changes in fuel content over time for the two engine operating conditions with a fixed additive treat rate to the fuel of 34 mg/h. The upper two panels show calculations for 1260 rev/min 5 Nm engine operating conditions. The lower two panels show data for 2710 rev/min 30 Nm engine operating conditions. Each "saw tooth" shape represents the effect of fuel level in the tank falling to a low lever and subsequent addition of fresh fuel, otherwise described as a refuelling event. Average metal concentration over time is seen to increase progressively with each refuelling event, until stabilisation takes place. Use of the same fixed additive treat rate of 34 mg/h at constant low speed low load operation is seen to result in a stabilised average metal concentration of just over 30 mg/kg. For the higher speed higher load condition the same additive treat rate is seen to result in a stabilised average metal concentration of about 7 mg/kg. Despite the previous view that a precisely controlled fuel additive metal content is necessary for satisfactory DPF regeneration, results indicate surprisingly that satisfactory regeneration results with wide variations not only over time as fuel level changes in the vehicle tank but also with engine speed and load where a fixed additive dose rate is employed with widely different engine operating conditions.

FIG. 10 shows data logger traces from a vehicle equipped with a DPF and also fitted with additive dosing apparatus operating on the principles of the present invention. The dosing apparatus used an electro-mechanical solenoid device to deliver an organo-metallic fuel additive into the fuel line feeding the injection pump of the vehicle. Although the additive treat rate was calculated on the basis of the possible maximum and minimum fuel flows passing through the dosing apparatus, the solenoid operation was operated at a fixed frequency independent of the actual flow of fuel.

FIG. 10 shows several similarities to FIG. 5, which depicts a regeneration event in a vehicle operating on fuel pre-treated with the same DPF regeneration additive at a treat rate delivering 20 ppm metal.

Features common to both traces are the increase of the post-DPF exhaust gas temperature to a level higher that the pre-DPF exhaust gas temperature, and the reduction of pre-DPF gas pressure even though engine speed remains substantially constant. The combination of these phenomena indicate soot combustion in the DPF leading to an exotherm and resulting gas temperature increase, and subsequent pressure reduction on soot burn-out.

FIG. 10 show that when an additive dosing apparatus embodying the features of the present invention is fitted to a vehicle equipped with a DPF, regeneration is essentially very similar to that achieved with fuel pretreated with additive.

FIG. 11 shows the additive concentration profile in the fuel as observed from fuel samples taken over a period of about 10 days. The samples were taken from the tank of the same road vehicle equipped with a DPF and fitted with an additive dosing apparatus embodying the features of the present invention. During the period when fuel samples were taken, the vehicle was refuelled several times, as is evident from the changing concentration of additive in the fuel. When refuelling took place, fuel additive concentration in the fuel fell from a high level when the tank was nearly empty to a very low level immediately after refuelling. This is consistent with the anticipated and calculated pattern of additive concentration in the fuel, when a dosing apparatus embodying the features of the present invention is employed.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

The invention claimed is:

1. A process for dosing a fuel with a fuel additive in a combustion engine and exhaust system fitted with a diesel particulate filter comprising
   (i) passing the fuel from a fuel container through a dosing apparatus
   (ii) dosing the fuel with additive in an amount based on the fuel passing through the dosing apparatus and independently of the concentration of the additive in the fuel
   (iii) returning a portion ("the returned portion") of the fuel to the container;
   wherein the additive catalyses the regeneration of the diesel particulate filter.

2. A process according to claim 1 wherein the additive is added to the fuel in direct proportion to the instantaneous fuel flow through the dosing apparatus.

3. A processing according to claim 1 wherein the additive is added to the fuel based on the flow of fuel passing through the dosing apparatus averaged over time.

4. A process according to claim 1 wherein the fuel is diesel.

5. A process accroding to claim 1 wherein the fuel additive is or comprises a metal.

6. A process according to claim 5 wherein the metal is selected from iron, strontium, calcium, cerium, sodium, platinum, copper, manganese and mixtures thereof.

7. A process according to claim 6 wherein the metal is iron.

8. A process according to claim 1 wherein the fuel additive is soluble in the fuel.

9. A process according to claim 1 wherein the portion of the fuel which is not returned to the container is passed to combustion chamber.

10. A process according to claim 1 wherein the portion of the fuel returned to the container is at least 80% of the fuel passing through the dosing apparatus.

11. A process according to claim 1 further comprising passing at least some of the returned portion through the dosing apparatus one or more further times and returning a portion thereof to the container.

12. A process according to claim 1 wherein the dosing apparatus comprises solid fuel soluble additive disposed in an additive container wherein the additive container is in fluid communication with fuel passing through the dosing apparatus.

13. A process according to claim 12 wherein the fuel passing through the dosing apparatus is controlled by an electromagnetic device.

14. A process according to claim 13 wherein the electromagnetic device is controlled by an electrical circuit to control fuel flow through the dosing apparatus.

15. A process according to claim 13 wherein the electrical circuit controls the fuel flow through the dosing apparatus in proportion to the flow of fuel from the container.

16. A process according to claim 13 wherein the electrical circuit controls the fuel flow through the dosing apparatus in proportion to the flow of fuel returning to the container.

17. A process according to claim 13 wherein the electrical circuit controls the fuel flow through the dosing apparatus independently of the flow of fuel to or from the container.

18. A process according to claim 13 wherein the electromagnetic device is a solenoid.

19. A process according to claim 1 wherein the dosing apparatus comprises liquid additive disposed in an additive container which is in fluid communication with fuel passing through the dosing apparatus.

20. A process according to claim 19 wherein the liquid additive is dosed into the fuel passing through the dosing apparatus by an electromagnetic device.

21. A process according to claim 20 wherein the electromagnetic device is controlled by an electrical circuit to dose additive at a controlled frequency.

22. A process according to claim 21 wherein the electrical circuit doses additive at a controlled frequency in proportion to the flow of fuel.

23. A process according to claim 21 wherein the electrical circuit doses additive at a controlled frequency at a fixed level independent of the flow of fuel.

24. A process according to claim 20 wherein the electromagnetic device is a solenoid.

25. A combustion engine and exhaust system comprising
a fuel storage container configured to pass fuel in operation from the container to a combustion chamber via an additive dosing apparatus, and wherein combustion gases produced in operation pass through an exhaust system comprising a diesel particulate filter,
wherein the dosing apparatus is configured to dose the fuel with additive in an amount based on the fuel passing through the dosing apparatus and independently of the concentration of the additive in the fuel and to return a portion ("the returned portion") of the fuel to the container, and the additive catalyses the regeneration of the diesel particulate filter.

26. A process for dosing a fuel with a fuel additive in a combustion engine and exhaust system fitted with a diesel particulate fitter comprising
(i) passing the fuel from a fuel container through a dosing apparatus
(ii) dosing the fuel with additive in an amount based on the fuel passing through the dosing apparatus and independently of the concentration of the additive in the fuel
(iii) returning a portion ("the returned portion") of the fuel to the container,
wherein the additive catalyses the regeneration of the diesel particulate filter;
and the dosing apparatus comprises liquid additive disposed in an additive container which is in fluid communication with fuel passing through the dosing apparatus.

* * * * *